United States Patent Office 3,671,261
Patented June 20, 1972

3,671,261
ARTIFICIAL SHRIMP FEED
Yaichi Ayukawa, Uhei Naruse, Tadayoshi Itoh, and Tsuneaki Miyakawa, Tokyo, Japan, assignors to CPC International Inc.
No Drawing. Filed Apr. 1, 1969, Ser. No. 812,363
Int. Cl. A23k 1/18
U.S. Cl. 99—2 R
8 Claims

ABSTRACT OF THE DISCLOSURE

Covers an artificial texturized feed useful in growing shrimp which comprises a dough-like composition kneaded or extruded into a form resembling vermicelli and including a protein source and a gum binder. A preferred protein source is corn gluten, and a preferred gum binder is a starch gum. A particularly useful feed contains corn gluten, starch gum and yeast, and may contain other ingredients, particularly other protein sources. The feed is of a form resembling vermicelli or spaghetti and is of a size large enough to be noticed by the shrimp when feeding, and yet of a size sufficiently small so that the shrimp can still clutch it. It is greatly preferred that the shrimp feed be in the form of rounded pieces which have been extruded or kneaded to a length of about 4.0–6.0 mm. and a diameter of 1.0–3.0 mm. The shrimp feed provides a food of an excellent low conversion ratio, and does not cause contamination or pollution of the culture water or sand bed due to its particular configuration and relative water-insolubility.

Shrimp, such as prawns, are usually grown by resort to the expedient of native feed such as clams and small shrimp, such as the Metapenaeopsis barbatus type. A native shrimp feed is particularly desirable in that it does not cause water pollution in the culture water or in the sand bed. That is, normally, when one utilizes clams or shrimp as feed the pH of the culture water remains within a range of from about 7.8 to about 8.2 and the COD (Chemical Oxygen Demand), hydrogen sulfide and ammonia nitrogen contents do not rise excessively. Usually when native feed is employed the COD is kept below about 1 p.p.m., the sulfide content below about 0.1 meq./liter and the ammonia nitrogen contain below about 0.2 p.p.m. Under such conditions the shrimp exhibit suitable growth.

While native shrimp feed is suitable for reasons just expressed, it does have a drawback in that the conversion ratio is not as low as is desired. The conversion ratio is expressed as the ratio of the weight of the feed expended to the gain of weight of shrimp utilizing the feed. As an example, when chopped clams are used as feed in the conventional manner, the conversion ratio is usually about 12:1. That is, it takes approximately 12 pounds of clams to obtain a 1 pound gain of weight of shrimp.

Thus, there has been suitable effort expended toward achievement of an artificial shrimp feed which would give one a desirable lower conversion ratio compared to conversion ratios obtained with native feed, such as clams or small shrimp. Yet, such lower conversion ratio must be achieved without causing the problem of contamination or pollution of the culture medium or sand bed, which pollution eventually will cause death of a substantial portion of the shrimp being cultured, or even complete destruction of all the shrimp.

Many proposed prior art artificial feeds, while exhibiting a low conversion ratio cause contamination due to the fact that they dissolve in the water prior to being consumed by the shrimp. The dissolved feed in turn causes extreme pollution of the culture medium and sand bed with excessive rise in pH, COD, sulfide content and ammonia nitrogen. In yet other situations the shrimp feed is not of the proper size and/or shape. That is, it is either too small to draw the attention of the shrimp or too large whereby the shrimp cannot conveniently clutch the feed. Other shrimp feeds while of proper size do not appear to have a shape which attracts the shrimp or, as noted above, dissolve before the shrimp can consume them.

In view of the above, it therefore becomes an object of the invention to provide a novel artificial texturized shrimp feed.

Another object of the invention is to provide the above feed which demonstrates a remarkable low conversion ratio.

Still another object of the invention is to provide a shrimp feed exhibiting a low conversion ratio which nevertheless does not pollute or contaminate the aqueous culture medium or sand bed in which the shrimp reside for the most part.

A still further object of the invention is to provide a shrimp feed having the above advantages which additionally is of a shape attractive to the shrimp and of a size which draws their attention, and still allows them to grab the feed.

A still further object of the invention is to provide the above shrimp feed with its attendant advantages, which feed is at least as economical as native feed, and in many instances more attractive from a commercial standpoint.

Other objects will appear hereinafter.

In accordance with the invention a novel artificial texturized feed useful in growing shrimp has been discovered. In its broadest aspects the shrimp feed comprises a dough-like composition kneaded or extruded into a form resembling vermicelli or spaghetti and includes as basic components a protein source and a gum binder.

The above shrimp feed may contain one or more protein sources, and one or more gums used as binding agents. In one preferred embodiment the protein source is a corn gluten and the gum binder is a starch gum. Another greatly preferred composition includes corn gluten and starch gum as well as a yeast source such as Torula yeast. The gum and protein source or sources are usually present in an amount ranging from about 5 parts by weight to about 40 parts by weight per 100 parts by weight of feed. The yeast when present is usually available in an amount ranging from about 5 parts by weight to about 20 parts by weight per hundred parts by weight of feed.

The shape or configuration and size of the feed are extremely important. Another important consideration is that the feed not be water-soluble to the point wherein it is dissolved prior to assimilation by the shrimp. It has been found that the shrimp feed should be rounded to a shape resembling noodles, or spaghetti. Even more preferably the shrimp feed should resemble vermicelli, which is a dough-like substance of a size smaller in diameter than spaghetti. It is greatly preferred that the feed be in the form of such rounded pieces just described wherein they have a length ranging from about 4.0 mm. to about 6.0 mm. and a diameter ranging from about 1.0 mm. to about 3.0 mm. When the feed has such just-described shape and size it attracts the shrimp, and also is sufficiently small to allow the shrimp to grab or clutch it, and thereby is conveniently assimilated. Moreover, due to the constitution of the feed, and particularly the presence of the relatively water-insoluble gum binder, the feed retains its shape in the aqueous culture medium, and does not deleteriously dissolve causing the problem of pollution or contamination discussed above.

As noted above, in many cases it is desirable to have present in the feed more than one protein source, and indeed this is the preferred situation. Usually there is present in the feed corn gluten as a protein source and at least one additional protein source such as fish meal, casein, clam extract, yeast, cornmeal, corn steep liquor and other useful materials of this class. It is greatly preferred that two proteins be contained in the feed, such as corn gluten and fish meal. Other protein sources, though not as preferred as those just enumerated, include soya, peanut meal, cottonseed and other oil seed flours, etc.

Again while starch gum is a preferred gum binder source, other gums may be used here such as guar gum, carboxy methylcellulose, tragacanth gum, etc. Again, one or more gums may be employed as binders here.

In addition to the gum binder and protein source it should be understood that a number of other ingredients may be present in the shrimp feed. For example, one may add compositions useful as growth accelerators, such as glycogen, vitamins such as vitamin $B_{12}$ and vitamin $B_6$, and various phosphate salts, such as calcium hydrogen phosphate.

In order to form the artificial feed of the invention one merely combines the desired ingredients, blends them to achieve uniformity and then kneads or extrudes the feed. In most instances water is added, or a protein source dissolved in water is utilized, such as corn steep liquor, to make the feed mass pliable. One excellent method of forming the feed pieces is to place the dough-like mass under rollers until the desired diameter is achieved. Then the rounded spaghetti-like pieces are cut to size and dried prior to their being actually utilized.

The following are typical general recipes useful as shrimp feeds here.

TABLE I

| Ingredient: | Parts by weight |
|---|---|
| Fish meal | 50–70 |
| Starch gum | 10–30 |
| Corn gluten | 10–30 |
| Vitamin source | 3–7 |

TABLE II

| Ingredient: | Parts by weight |
|---|---|
| Casein | 50–70 |
| Corn gluten | 10–30 |
| Clam extract | 5–15 |
| Starch gum | 10–30 |
| Vitamin source | 3–7 |

TABLE III

| Ingredient: | Parts by weight |
|---|---|
| Corn gluten | 10–30 |
| Yeast | 5–15 |
| Starch gum | 5–15 |
| Corn steep liquor | 5–15 |
| Fish meal | 10–30 |
| Cornmeal | 5–15 |
| Casein | 3–7 |

TABLE IV

| Ingredient: | Parts by weight |
|---|---|
| Corn gluten | 20–40 |
| Yeast | 10–20 |
| Starch gum | 5–15 |
| Glycogen | 0.05–0.5 |
| Fish meal | 20–40 |
| Cornmeal | 5–15 |
| Corn steep liquor | 3–7 |
| Calcium hydrogen phosphate | 0.5–2 |

The following examples illustrate typical shrimp feedstuffs, and their utilization by prawns. It is understood, of course, that these examples are merely illustrative, and that the invention is not to be limited thereto. All parts are expressed in parts by weight.

EXAMPLE I

Here, the following ingredients were combined, blended, molded into the shape of spaghetti and cut into pieces: 60 parts fish meal; 20 parts corn gluten; 20 parts starch gum; and 5 parts vitamins. The feed was cut into rounded pieces approximately 5.0 millimeters long and had a diameter of about 2.0 millimeters. The artificial shrimp feed was then fed to prawn (*P. japonicus*) for 30 days. The initial weight of the prawn was about 10 g. each. Ten of these were cultivated in a water tank of a size 30 x 60 x 36 cm.

In Table V below, the COD and other properties of the culture water was measured after 0 days, 15 days and 30 days. It is clearly evident that the feed does not cause pollution of the water, and the water critical properties of pH etc. are kept well within acceptable limits. The water in essence changed little in its desirable qualities.

TABLE V.—CHANGE IN CULTURE WATER PROPERTIES DURING FEEDING

| Water properties | Lapsed feeding period, days | | |
|---|---|---|---|
| | 0 | 15 | 30 |
| COD (p.p.m.) | 0.02 | 1.23 | 1.45 |
| pH | 8.0 | 7.7 | 7.7 |
| $NA_4$-N (p.p.m.) | 0.01 | 0.25 | 0.30 |
| $H_2S$ (meq./liter) | 0.01 | 0.12 | 0.12 |

EXAMPLE II

Here, prawns were again cultivated as described in Example I but with the following feed: casein, 60 parts; gluten, 20 parts; clam extract, 10 parts; starch gum, 20 parts; and vitamin mix, 5 parts. Again, when the shrimp feed was of the proper shape and size in accordance with the invention, the prawns fed in a desirable manner, and no pollution of water was noted.

Table VI below follows the water quality throughout this run.

TABLE VI.—CHANGE IN CULTURE WATER PROPERTIES DURING FEEDING

| Water properties | Lapsed feeding period, days | | |
|---|---|---|---|
| | 0 | 15 | 30 |
| COD (p.p.m.) | 0.01 | 1.02 | 1.32 |
| pH | 8.0 | 7.8 | 7.8 |
| $NA_4$-N (p.p.m.) | 0.00 | 0.22 | 0.26 |
| $H_2S$ (meq./liter) | 0.01 | 0.05 | 0.05 |

EXAMPLE III

Here a further specific shrimp feed was prepared containing the following ingredients: 20 parts gluten; 10 parts Torula yeast; 10 parts starch gum; 10 parts corn steep liquor; 20 parts fish meal; 10 parts cornmeal; and 5 parts casein. Again, the feed was prepared according to the directions of Example I in the desired shape and size, and fed to prawns. No pollution or contamination of the sand beds or aqueous culture medium was noted here. Table VII bears out this conclusion.

TABLE VII.—CHANGE IN CULTURE WATER PROPERTIES DURING FEEDING

| Water properties | Lapsed feeding period, days | | |
|---|---|---|---|
| | 0 | 15 | 30 |
| COD (p.p.m.) | 0.01 | 0.91 | 1.02 |
| pH | 8.0 | 7.8 | 7.8 |
| $NA_4$-N (p.p.m.) | 0.00 | 0.12 | 0.15 |
| $H_2S$ (meg./liter) | 0.00 | 0.05 | 0.08 |

EXAMPLE IV

In this run a shrimp feed containing ingredients listed below was prepared and utilized to cultivate prawns in the manner disclosed in Example I. As a comparative test, exact conditions of feeding were carried out, except utilizing clams as the shrimp feed. The conversion ratio with the feedstuff of the invention was 3:1 while the conversion ratio utilizing clams as feed was 12:7. Thus, it is seen that the artificial shrimp feed of the invention is clearly superior to that of the native clam feed. Further, no water pollution was observed in either case of feeding with clams or the shrimp feed of the invention.

The specific feed prepared in this comparative test was as follows: 30 parts corn gluten; 15 parts Torula yeast; 10 parts starch gum; 0.1 part glycogen; 30 parts fish meal; 10 parts cornmeal; 5 parts corn steep liquor and 1 part calcium hydrogen phosphate.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

1. A particulate artificial feed composition that is useful in shrimp culture as shrimp feed, the individual particles of which have sizes and shapes that permit a shrimp to grasp a feed particle, comprising rounded particles having lengths in the range from about 4.0 mm. to about 6.0 mm. and diameters in the range from about 1.0 mm. to about 3.0 mm., formed by mechanically shaping a dough-like composition of a mixture of at least one protein source and an edible gum binder into a form generally resembling particles of vermicelli.

2. A particulate food composition in accordance with claim 1 wherein the protein source is corn gluten and the gum binder is a starch gum, and wherein each is present in an amount in the range from about 5 parts to about 40 parts by weight for each 100 parts by weight of the particulate feed composition.

3. A particulate artificial feed composition in accordance with claim 1 wherein the protein source is selected from the group consisting of corn gluten, fish meal, casein, clam extract, yeast, cornmeal, corn steep liquor, and mixtures thereof.

4. A particulate artificial feed composition in accordance with claim 1 wherein the individual particles of the feed composition are substantially insoluble in water.

5. A particulate artificial feed composition in accordance with claim 1 wherein said dough-like composition comprises from about 50 to about 70 parts by weight of fish meal, from about 10 to about 30 parts by weight of starch, from about 10 to about 30 parts by weight of corn gluten, and from about 3 to about 7 parts by weight of a vitamin supplement.

6. A particulate artificial feed composition in accordance with claim 1 wherein the dough-like composition comprises from about 50 to about 70 parts by weight of casein, from about 10 to about 30 parts by weight of corn gluten, from about 5 to about 15 parts by weight of clam extract, from about 10 to about 30 parts by weight of starch gum, and from about 3 to about 7 parts by weight of a vitamin supplement.

7. A particulate artificial feed composition in accordance with claim 1 wherein the dough-like composition comprises from about 10 to about 30 parts by weight of corn gluten, from about 5 to about 15 parts by weight of yeast, from about 5 to about 15 parts by weight of starch gum, from about 5 to about 15 parts by weight of corn steep liquor, from about 10 to about 30 parts by weight of fish meal, from about 5 to about 15 parts by weight of cornmeal, and from about 3 to about 7 parts by weight of casein.

8. A particulate artificial feed composition in accordance with claim 1 wherein the dough-like composition comprises from about 20 to about 40 parts by weight of corn gluten, from about 10 to about 20 parts by weight of yeast, from about 5 to about 15 parts by weight of starch gum, from about 0.05 to about 0.5 parts by weight of glycogen, from about 20 to about 40 parts by weight of fish meal, from about 5 to about 15 parts by weight of cornmeal, from about 3 to about 7 parts by weight of corn steep liquor, and from about 0.5 to about 2 parts by weight of calcium hydrogen phosphate.

References Cited

UNITED STATES PATENTS

| | | | |
|---|---|---|---|
| 3,351,531 | 11/1967 | Noznick et al. | 99—14 |
| 3,442,568 | 5/1969 | Okumura | 99—83 |
| 2,583,964 | 1/1952 | Otter | 99—2 |
| 3,428,459 | 2/1969 | Hinds | 99—3 |
| 3,467,525 | 9/1969 | Hale et al. | 99—2 |

FOREIGN PATENTS

| | | | |
|---|---|---|---|
| 385,796 | 1/1933 | Great Britain | 79—86 |

OTHER REFERENCES

Yamagutchi-ken Inland Sea Fisheries Experimental Station Research Contribution, vol. 11, No. 1, 1961, pp. 354–385.

Zoula P. Zein-Eldin, Experimental Growth Studies with Postlarval Brown Shrimp, pp. 61–2.

Chemicals Used in Food Processing, National Academy of Sciences, National Research Council, Publication 1274, 1965, p. 263.

FAC Fisheries Report No. 57, vol. 3, June 1967, p. 815.

NORMAN YUDKOFF, Primary Examiner

C. P. RIBANDO, Assistant Examiner

U.S. Cl. X.R.

99—3, 83, 131